(12) United States Patent
Brinn

(10) Patent No.: US 8,882,630 B2
(45) Date of Patent: Nov. 11, 2014

(54) TRANSMISSION

(71) Applicant: Herbert P. Brinn, Kalamazoo, MI (US)

(72) Inventor: Herbert P. Brinn, Kalamazoo, MI (US)

( * ) Notice: Subject to any disclaimer, the term of this patent is extended or adjusted under 35 U.S.C. 154(b) by 28 days.

(21) Appl. No.: 13/647,412

(22) Filed: Dec. 26, 2012

(65) Prior Publication Data

US 2014/0179486 A1    Jun. 26, 2014

(51) Int. Cl.
*F16H 3/78* (2006.01)

(52) U.S. Cl.
CPC ........................... *F16H 3/78* (2013.01)
USPC ............ 475/323; 475/269; 475/286; 475/317

(58) Field of Classification Search
CPC ............... F16H 1/28; F16H 2001/289; F16H 2001/324; F16H 1/16; F16H 3/005; F16H 2003/007; F16H 3/44; F16H 2003/445; F16H 2003/447; F16H 9/26; F16H 37/027; F16H 2200/0034; F16H 2200/2007; F16H 2200/2033

USPC .................. 475/296, 305, 317, 323; 192/3.52
See application file for complete search history.

(56) References Cited

U.S. PATENT DOCUMENTS

| | | | | | |
|---|---|---|---|---|---|
| 3,728,912 | A | * | 4/1973 | Darnell | 475/290 |
| 4,677,875 | A | * | 7/1987 | Batchelor | 475/85 |
| 4,694,708 | A | * | 9/1987 | Hartmann | 475/269 |
| 5,167,594 | A | * | 12/1992 | Egan | 475/330 |

OTHER PUBLICATIONS

U.S. Appl. No. 13/425,463, filed Mar. 21, 2012, Brinn.

* cited by examiner

*Primary Examiner* — Edwin A Young
*Assistant Examiner* — Colby M Hansen

(57) ABSTRACT

A racing transmission. The racing transmission has a low gear, reverse gear, neutral and a direct drive gear. The transmission utilizes a drive shaft and two sets of planetary and sun gears. The transmission does not use a countershaft to accomplish low and reverse.

1 Claim, 5 Drawing Sheets

TRANSMISSION

BACKGROUND OF THE INVENTION

U.S. patent Ser. No. 13/425,463 entitled "Transmission", in the name of Herbert P. Brinn is herein incorporated by reference for what it teaches about transmissions.

Transmissions are not new to the art. However, the present invention has many advantages not available in prior art devices. The instant device is much simpler than prior art devices. Prior art transmissions for oval track racing have been modified versions of either automotive standard shift transmissions or automotive automatic shift transmissions. Some prior art transmissions have been developed for racing in recent years but are designed with countershafts to allow reverse and the use of lower gears.

Modified automatic transmissions do not use a countershaft but are typically bulky and heavy as well as unreliable. The device of the present invention allows for the elimination of the countershaft in a manual transmission and allows for a much lighter transmission. The device of the present invention also allows for the transmission to be used in direct drive without any power being applied to the gear train which also increases performance, durability and reliability. A lighter more durable transmission allows the user to be more competitive in the oval track arena. The present invention also eliminates the need for a valve rod and system to operate the low and reverse. This is accomplished by a dual set of planetary gears that allow the user to simply select low or reverse because the two sets of planetary gears are both ready and activated by the clutch. The user simply chooses which gear and activates the clutch.

THE INVENTION

The present invention is an automotive transmission that has a housing. There is supported within the housing, a drive shaft that is comprised of an input shaft and an output shaft. The drive shaft is driven by a power source. There is slidably a mounted front drive dog ring on the drive shaft. There is slidably mounted on the drive shaft, a rear drive dog ring; a gear housing, and contained in the gear housing, two planetary gear housings and carriers. The planetary gears comprise a central sun gear rotatably mounted on the input shaft, and two planetary gear sets consisting of at least three planet gears per set surrounding the common sun gear. The planetary gear housings and carriers are covered by circumferential ring gears that have internal surface gears that mesh with the planet gears.

The planetary gears are activated by a hydraulically driven control cylinder that applies a band on the clutch drum which activates both planetary gear sets when the front drive dog is engaged.

The planetary gear sets movement wherein one planetary gear set runs clockwise and the other planetary gear set runs counter clockwise, simultaneously.

The front dog ring engages the planetary sun gear which is common to both gear sets to drive the planetary gear sets. The front dog ring is driven by the input shaft while the front dog ring disengages from the planetary sun gear when direct drive is selected bypassing the planetary gear sets.

The rear dog ring is surmounted on the output shaft and further drives the output shaft. The rear dog ring is activated by the shift lever selecting low gear position, reverse gear position, neutral position and direct drive position. When the direct drive position is selected the rear dog ring is disengaged from the planetary gear sets. There is a shift rod. The shift rod comprises an inner shaft that has a middle portion and an outer shell. The shift rod has a distal end and a near end. The shift rods outer shell is spring biased at the near end. The shift rods outer shell has a first shift fork assembly mounted at the distal end of the shift rod. The shift fork of the first shift fork assembly is engaged to the forward dog ring. The shift rod inner shaft has mounted near the rear dog ring, a second shift fork assembly. The shift fork of the second shift fork assembly is engaged to the rearward dog ring. The fork is slidably mounted on the outer shift rod.

DETAILED DESCRIPTION OF THE DRAWINGS

Figure 1:
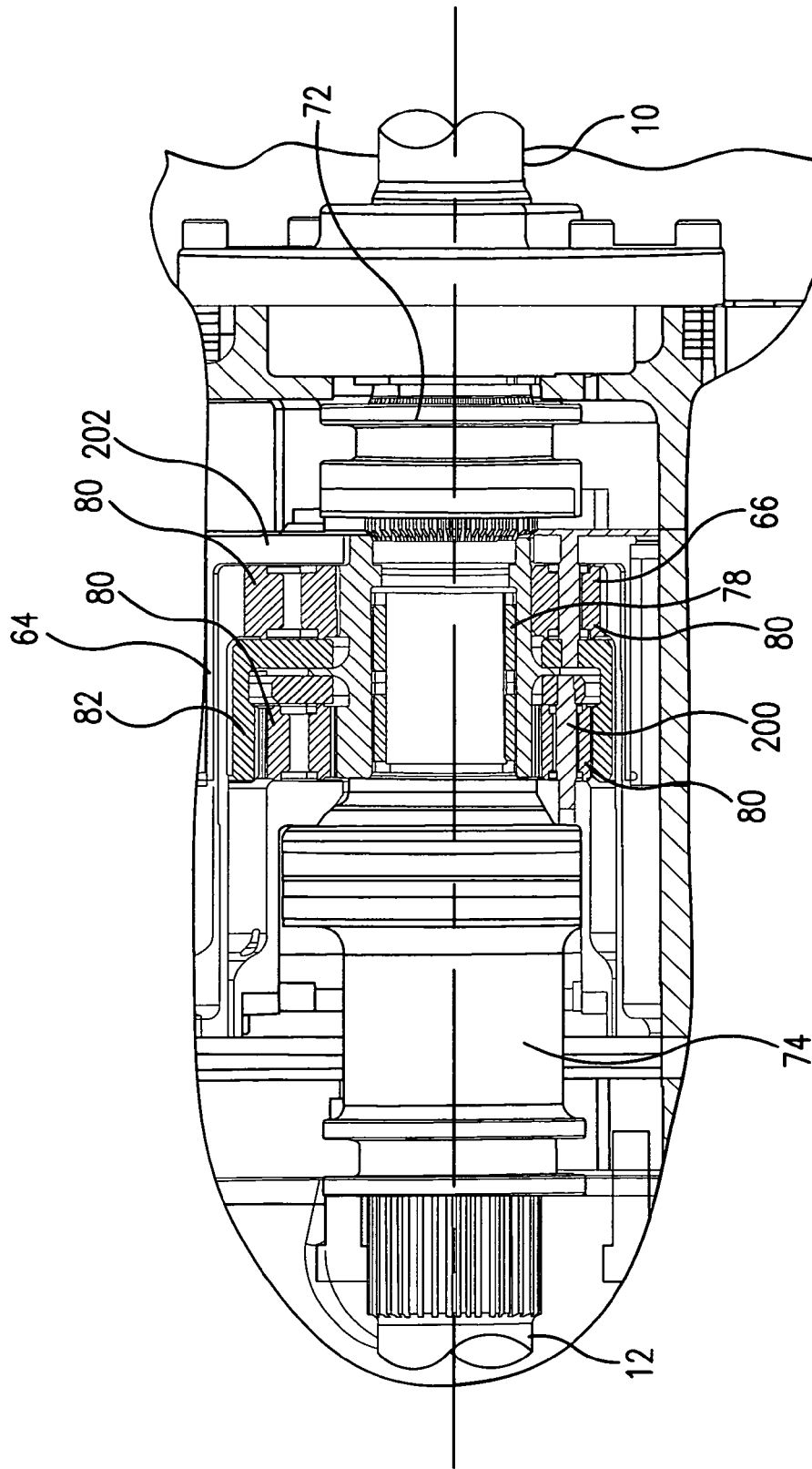
FIG. 1 shows the new transmission.

FIG. 1 shows the new transmission in a cut away view. It is critical that the distinction from the previous Brinn transmission be set forth clearly at this point. The new transmission has a greater utility over the prior art version in that there has been an elimination of several parts that have lowered the cost of production and made a more light weight, durable transmission. It has been discovered that the addition of another set of planetary gears that is now operated by one band instead of two has eliminated all valves and the hydraulic shifting mechanism components along with the second band and one the hydraulic cylinders. Not only did the new discovery eliminate the second band and its control components the new configuration operates both the low and reverse gear sets at the same time or simultaneously. This means, that as with the other transmission, once the clutch is activated the hydraulics compress the band against the outside of the clutch drum activating both the forward and the reverse planetary gear sets. It is now up to the driver to select which gear he needs before the clutch is activated. The low gear planetary gear set is turning in a clockwise direction at the same time the reverse planetary gear set is turning in a counter clockwise direction driving the rear dog ring and the output shaft in whichever direction is selected. In the earlier Brinn transmission the shift selector was in tune with the hydraulic controls controlling the activation of the planetary gear set by gear selection, this has been eliminated. Both low and reverse planetary gear sets are now activated at the same time and once again the operator merely selects which gear that is desired and applies the clutch. It should be obvious to one skilled in the art that this not only simplifies the shifting of the transmission but makes it more efficient, and for a racing application this is a tremendous advantage.

It also means that the new transmission has fewer parts leading to less complexity and less probability of failure due to less components being engaged and driven.

The reduction in parts also lends itself to faster and cheaper assembly times. With that said it is also obvious to one skilled in the art that maintenance is faster and less likely. The prior version of the transmission used a two shaft shift mechanism that linked the hydraulic and the mechanical aspects and with that eliminated there is no need to time or synchronize each system to the other. Again, this will save money during production of the new transmission.

Durability has also increased because it has also been discovered that with fewer operating parts there are fewer parts that can fail, again in a racing application this means the difference between winning and losing. That has a direct impact on the financial bottom line.

FIG. 1 further shows the relationship between the input shaft 10, sun gear 78, and the first planetary gear set 66 and the second planetary gear set 200. One skilled in the art will appreciate the fact that the sun gear 78 is the center of the planetary gear sets 66,200 and is surrounded by smaller orbiting gears which are the planetary gears 80 and that on the outside edge of the planetary gear set 66 is an outer ring 64 or planetary ring gear 64 that engages or meshes with the planet gears 8O. Also shown is the planetary gear carrier 82 supporting the planetary gear set 200. This embodiment has a four planet gear 80 configuration. It should be clear to any one skilled in the art that any configuration of planet gears 80 to a sun gear 78 is acceptable, meaning a three gear series, a four gear series, a five gear series, etc. are all feasible without a variance from the spirit of the present invention.

There are features of the earlier transmission that have not changed that would include the configuration of the front drive dog 72, the rear drive dog 74, shift forks 58 and the spring bias 76 of the shift rod 30. However, the valve and related components are gone. Also there is one less band and its hydraulic cylinder to operate it.

Figure 2:
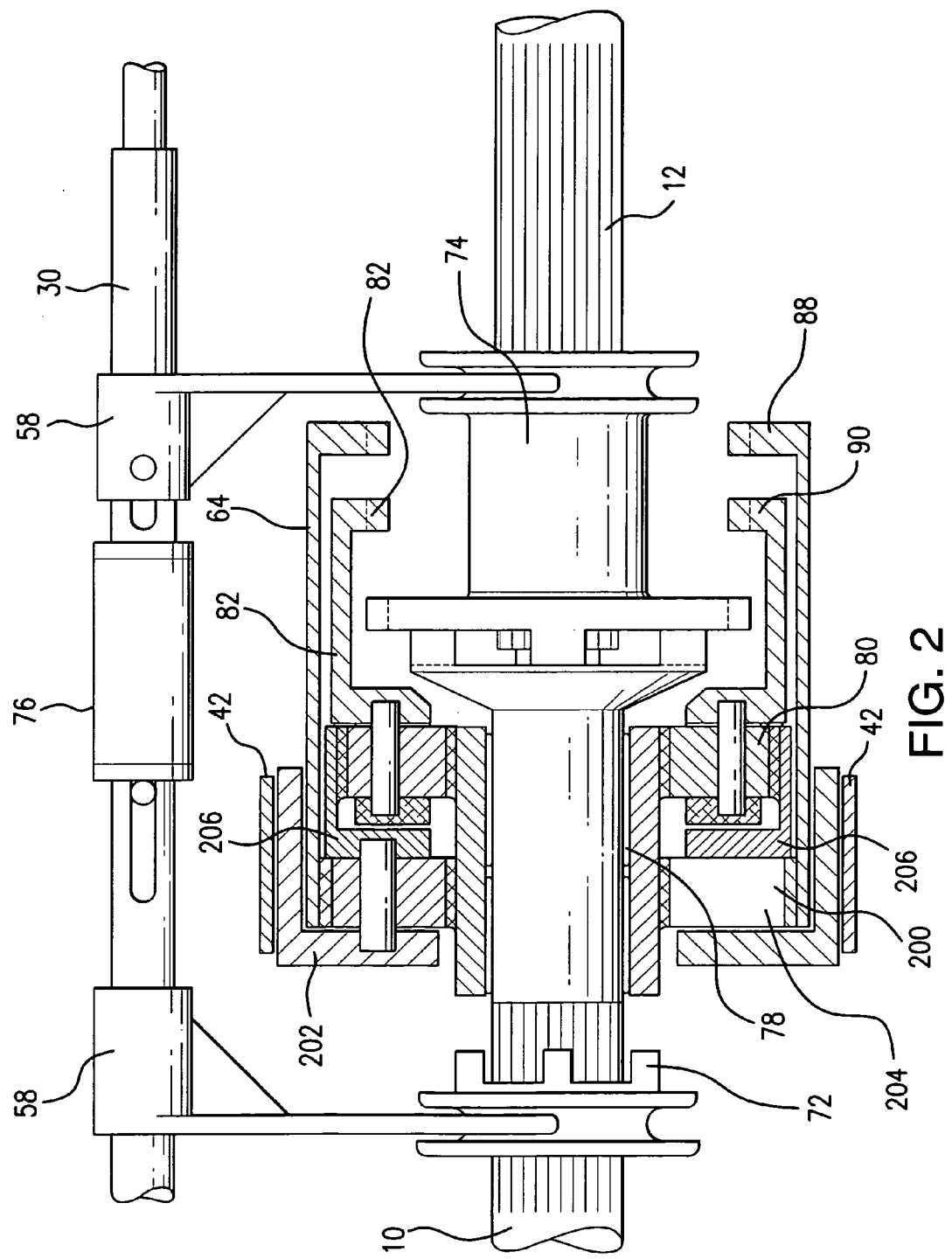
FIG. 2 shows the new transmission is direct drive.

When hydraulic pressure is applied to the band 42 it locks the clutch drum 202 which locks the front planetary carrier 204 (FIG. 2) and the rear planetary ring 206. FIG. 2 shows the planetary carrier 204 after the removal of the lower left hand planetary gear 80. This drives the reverse ring gear 64 in a counter clock wise direction and the low gear planetary carrier 82 in a clockwise direction when the front dog ring 72 has been engaged in the sun gear 78.

If reverse has been selected the reverse drive plate 88 is meshed with the rear dog ring 74 which drives the output shaft 12 in reverse.

If low gear has been selected the low gear drive plate 90 is meshed with the rear dog ring 74 which drives the output shaft 12 forward in low gear.

FIG. 1 is in direct drive as the rear dog ring 74 and input shaft 10 is meshed bypassing the planetary gears 66 and 200 their operation.

FIG. 2 shows the transmission 2 internally in direct drive. The rear dog ring 74 is positioned in the far left hand position which couples the input shaft 10 directly to the output shaft 12. The front dog ring 72 is also positioned in the far left hand position which uncouples the sun gear 78 from the input shaft 10 and prevents any power from being transmitted by the planetary gear set 66 or 200. Also visible are the shift forks 58 that are connected to the shift rod 30 for gear selection. The first and second planetary gear sets 66 and 200 are visible. Because the transmission is in direct drive the reverse and low portions are inoperable. However, the low and reverse aspects are still visible.

Also visible are the clutch drum 202 and rear planetary ring 206.

Figure 3:
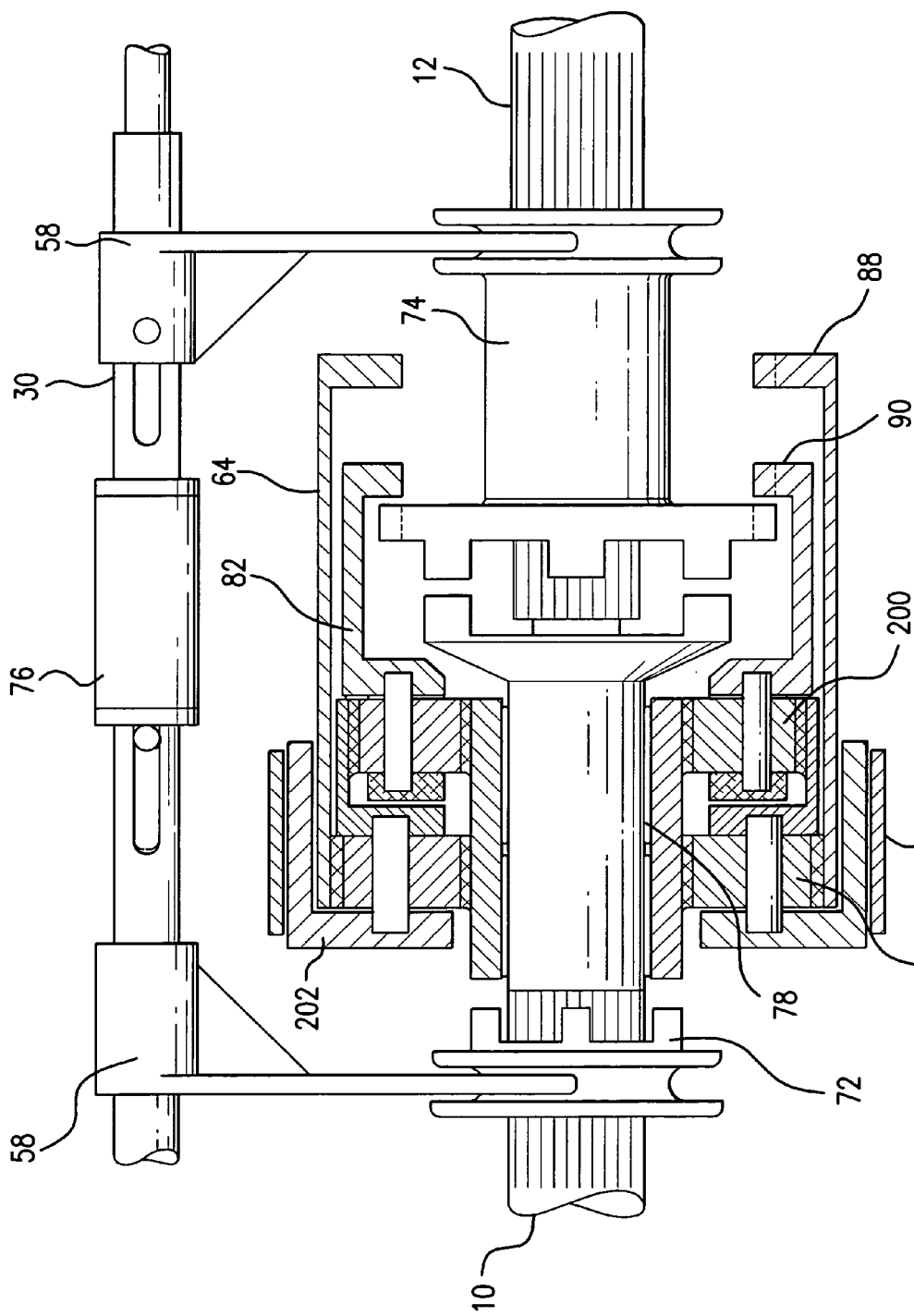
FIG. 3 shows the new transmission in neutral.

FIG. 3 shows the new transmission 2 internally in the neutral position. The shift rod 30, the shift forks 58, the front dog ring 72 and the rear dog ring 74 have been moved slightly to the right from the direct drive position. This movement has disengaged the rear dog ring 74 from the input shaft 10 so that there is no power being transmitted to the output shaft 12. The motor is running but the vehicle is stationary.

Figure 4:
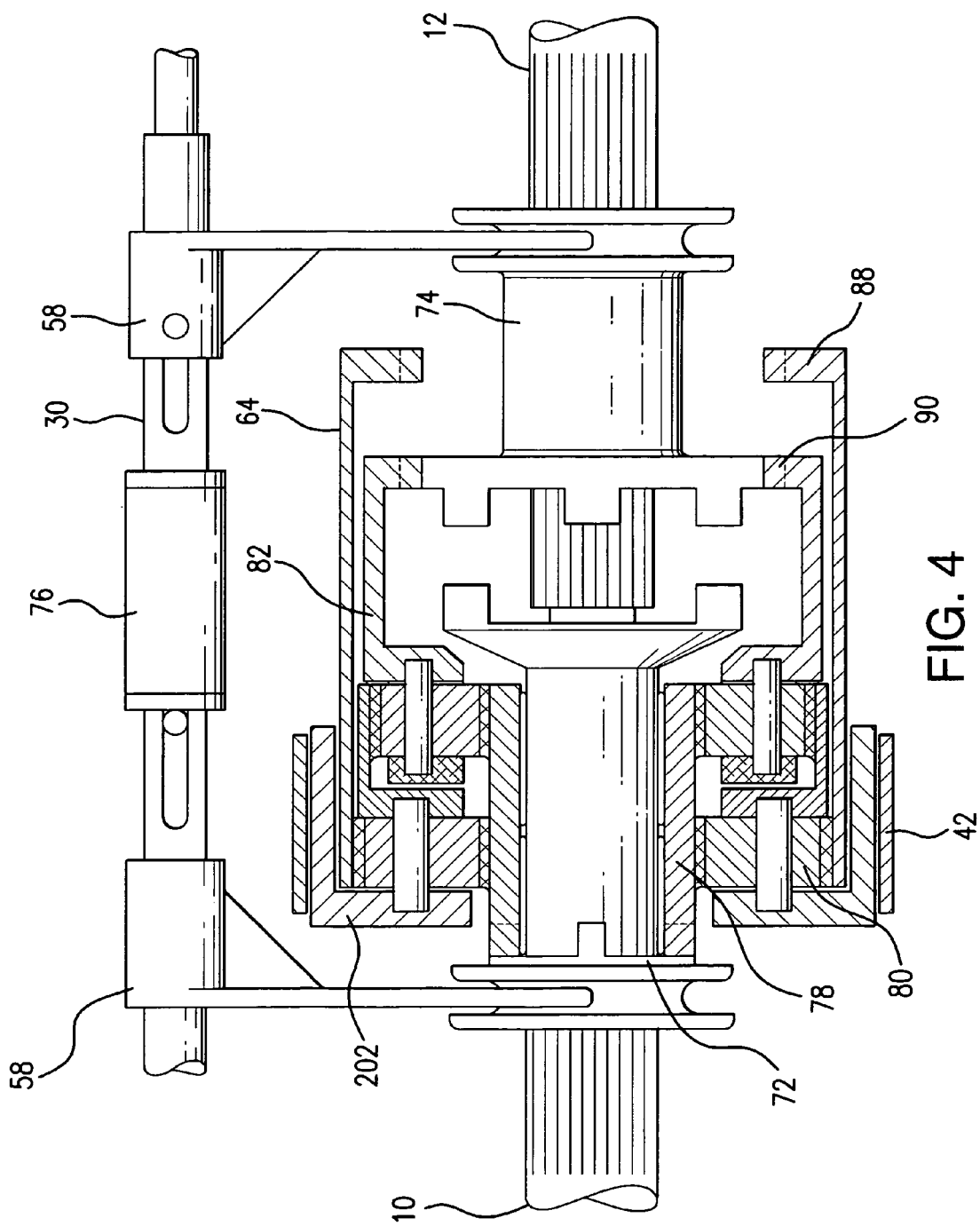
FIG. 4 shows the new transmission in low gear.

FIG. 4 shows the new transmission 2 internally in the low gear position. The shift rod 30, the shift forks 58, the front dog ring 72, and the rear dog ring 74 have been moved to the right from the neutral position. The front dog ring 72 has been moved into mesh with the planetary sun gear 78. The rear dog ring 74 has been moved into mesh with the low gear drive plate 90. The band 42 has been applied to lock the clutch drum 202, forcing the planetary carrier 82 to rotate and drive the rear dog ring 74 in the forward direction, which drives the output shaft 12 in the forward direction.

Figure 5:
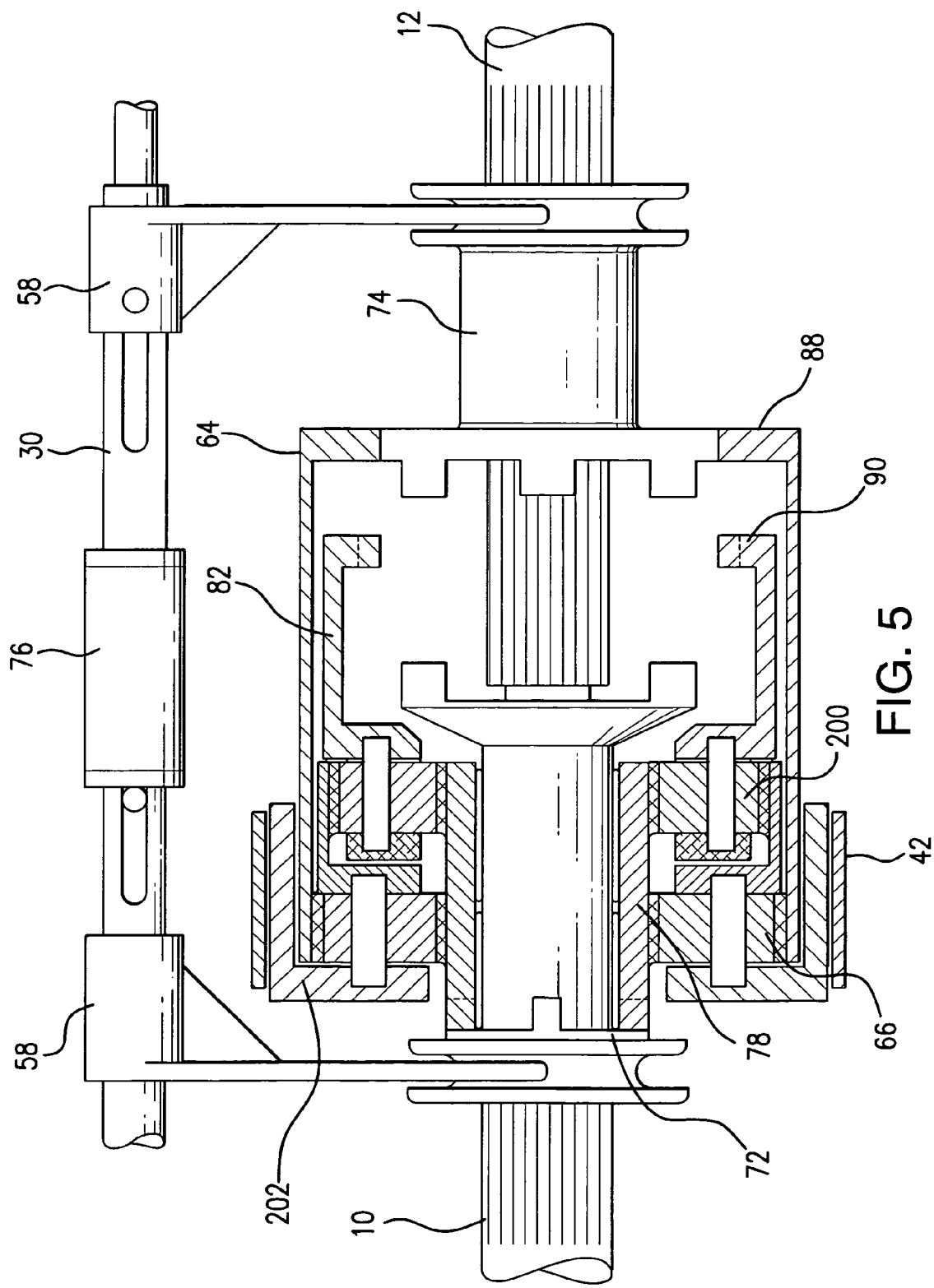
FIG. 5 shows the new transmission in reverse.

FIG. 5 shows the new transmission 2 internally in the reverse position. The shift rod 30, rear shift fork 58, and rear dog ring 74 have moved to the right from the low gear position, leaving the front shift fork 58, the front dog ring 72 in the same position as the low gear position by compressing the bias spring 76, and moving the rear dog ring 74 into mesh with the reverse drive plate 88. The band 42 has been applied to lock the clutch drum 202, forcing the planetary ring gear 64 to drive the reverse drive plate 88 and the rear dog ring 74 in reverse, which drives the output shaft 12 in reverse.

One skilled in the art will realize that this transmission uses a band clutch and it is well within the scope of this invention to use a disc clutch or cone clutch without deviating from the spirit of the present invention.

One skilled in the art will also realize that one set of planetary gears are marginally different in size from the other set to accommodate the planetary carrier 82.

What is claimed is:

1. An automotive transmission, said transmission comprising:
   i. a housing;
   ii. supported within said housing, an input shaft and an output shaft, said input shaft driven by a power source;
   iii. slidably mounted on said input shaft, a front drive dog ring;
   iv. slidably mounted on said input shaft, a rear drive dog ring;
   v. a gear housing, and contained in said gear housing, two planetary gear sets and carriers, said planetary gear sets comprising a central common sun gear rotatably mounted on said input shaft, two planetary sets and at least three planet gears per set surrounding said sun gear, said planetary gear sets and carriers being covered by circumferential ring gears having internal surface gears that mesh with said planet gears;
   vi. said planetary gears being activated by a front dog ring and a hydraulically driven control cylinder that applies a band on a clutch drum;
   vii. said planetary gear sets movement wherein one planetary gear set runs clockwise and said other planetary gear set runs counter clockwise, simultaneously, when, said clutch is applied and said front dog ring is engaged;
   viii. said front drive dog ring engages one planetary sun gear to drive said planetary gear sets; said front dog ring is driven by said input shaft; said front dog ring disengages when direct drive is selected bypassing said planetary gear sets;
   ix. said rear dog ring is surmounted on said output shaft and further drives said output shaft; said rear dog ring is activated by a shift lever selecting low gear position, reverse gear position, neutral position and direct drive position; when said direct drive position is selected said rear dog ring is disengaged from said planetary gear sets;
   x. a shift rod, said shift rod comprised of an inner shaft having a middle portion and an outer shell, said shift rod having a distal end and a near end,
   xi. said shift rod outer shell rod being spring biased;
   xii. said shift rod outer shell having first shift fork assembly mounted at said distal end of said shift rod, the shift fork of said first shift fork assembly being engaged to the forward dog ring;
   xiii. said shift rod inner shaft having mounted at said rear dog ring, a second shift fork assembly, said shift fork of said second shift fork assembly being engaged to said rearward dog ring; a fork of said second shift fork assembly being slidably mounted on said outer shift rod.

* * * * *